United States Patent
Wang et al.

(10) Patent No.: US 9,772,865 B2
(45) Date of Patent: Sep. 26, 2017

(54) ON-DEMAND LOADING OF DYNAMIC SCRIPTING LANGUAGE CODE FOR REDUCED MEMORY USAGE

(71) Applicant: Futurewei Technologies, Inc., Plano, TX (US)

(72) Inventors: Haichuan Wang, Champaign, IL (US); Handong Ye, Union City, CA (US); Peng Wu, Rochester, NY (US)

(73) Assignee: Futurewei Technologies, Inc., Plano, TX (US)

( * ) Notice: Subject to any disclaimer, the term of this patent is extended or adjusted under 35 U.S.C. 154(b) by 41 days.

(21) Appl. No.: 14/629,197

(22) Filed: Feb. 23, 2015

(65) Prior Publication Data
US 2016/0246620 A1 Aug. 25, 2016

(51) Int. Cl.
*G06F 9/44* (2006.01)
*G06F 9/445* (2006.01)
*G06F 9/455* (2006.01)

(52) U.S. Cl.
CPC ...... *G06F 9/44521* (2013.01); *G06F 9/44594* (2013.01); *G06F 9/45512* (2013.01)

(58) Field of Classification Search
CPC ..... G06F 8/30; G06F 8/31; G06F 8/43; G06F 8/4434; G06F 9/4446; G06F 9/44505; G06F 9/44594; G06F 9/44521
See application file for complete search history.

(56) References Cited

U.S. PATENT DOCUMENTS

| | | | |
|---|---|---|---|
| 2005/0125690 A1 | 6/2005 | Chin | |
| 2006/0288353 A1* | 12/2006 | King | G06F 8/43 719/331 |
| 2007/0220429 A1* | 9/2007 | Kureshy | G06F 9/4446 715/708 |
| 2009/0089507 A1 | 4/2009 | Chen et al. | |

(Continued)

FOREIGN PATENT DOCUMENTS

| | | |
|---|---|---|
| CN | 101398752 A | 4/2009 |
| CN | 101834608 A | 9/2010 |
| CN | 102270181 A | 12/2011 |

OTHER PUBLICATIONS

"International Application Serial No. PCT/CN2016/073859, International Search Report mailed May 25, 2016", 11 pgs.

(Continued)

*Primary Examiner* — Tuan Vu
(74) *Attorney, Agent, or Firm* — Schwegman Lundberg & Woessner, P.A.

(57) ABSTRACT

A computer-implemented method and system for reducing the amount of memory space required to store applications written in dynamic scripting languages loads a program module into memory and removes a category of program code, such as debug information or function definitions, from the program module. The method and system also receives a request for debug information, or a function call or query, and determines whether or not the corresponding program code is in memory. If not, then the location in storage is identified where the program module is stored, and another copy containing the corresponding program code is loaded into memory. The corresponding program code is located and copied into the program module in memory, and a response is provided to the request.

24 Claims, 5 Drawing Sheets

(56) References Cited

U.S. PATENT DOCUMENTS

| | | | |
|---|---|---|---|
| 2009/0204963 A1* | 8/2009 | Swart | G06F 9/44594 718/1 |
| 2010/0242017 A1* | 9/2010 | Stenberg | G06F 8/30 717/111 |
| 2011/0131561 A1* | 6/2011 | Adams, III | G06F 8/4434 717/159 |
| 2011/0173597 A1* | 7/2011 | Cascaval | G06F 9/44505 717/148 |
| 2016/0154629 A1* | 6/2016 | Noens | G06F 8/31 717/107 |

OTHER PUBLICATIONS

"International Application Serial No. PCT/CN2016/073859, Written Opinion mailed May 25, 2016", 3 pgs.

* cited by examiner

ON-DEMAND LOADING OF DYNAMIC SCRIPTING LANGUAGE CODE FOR REDUCED MEMORY USAGE

TECHNICAL FIELD

This description relates generally to compiling and loading dynamic scripting language code, and more particularly to reducing memory usage through on-demand compiling and loading of application source code in dynamic scripting languages.

BACKGROUND

Dynamic scripting languages are widely used in many industry and academic areas. For example, JavaScript is widely considered the dominant computer programming language for building client-side web applications; PHP typically is the backbone used to build server-side web applications; Python is widely used in building both high-level and low-level applications; Lua has been widely applied in the gaming industry and in embedded systems; R and Matlab have become popular for particular uses.

In general, the performance of dynamic scripting languages poses a concern. For example, applications written in dynamic scripting languages typically run slower and use more memory than applications based on static languages. Yet, in many scenarios memory usage is of critical importance. In typical embedded systems, for example, if an application requires more memory than is available the application will crash.

The memory used by an application generally includes a code section and a data section. In many applications, the code section can use up to half of the total required memory. As a result, reducing the amount of memory required for the code section can be an effective way to reduce overall application memory usage.

Existing solutions to reduce the amount of memory required for the code section include rewriting or restructuring the application to remove unnecessary code. This is made possible because applications typically include source code for all possible features of the application, even though some of the features generally will not be executed. Rewriting or restructuring the code can ensure only necessary code is included in the application.

However, rewriting or restructuring the code is relatively labor intensive, and thus, relatively expensive. Moreover, the decision regarding the usefulness or necessity of a section of code can be ambiguous based purely on static information. A more certain determination often is only possible using the information available at runtime.

Another reason dynamic scripting languages use more memory space is that by default dynamic scripting languages typically store all of the relevant debugging information for an application in the compiled object code, or bytecode, in memory. In some cases, the debug information occupies more than a third of the memory space used by the programming code. Nevertheless, the debug information typically is used only rarely, for example, when an error occurs during application execution or when reflection functions are invoked during execution.

Existing solutions to reduce the amount of memory required for the code section also include removing debug information by precompiling the application source code into bytecode. For example, Lua source code can be precompiled using the "-s" command extension to strip all debugging information in the source code, although an equivalent approach is not available in some dynamic scripting languages. However, use of such an approach does not permit retrieval of the debug information at runtime. In addition, when a runtime error occurs, the application is not able to report useful information, such as the line number in the code where the error occurred, variable names associated with the error, and the like.

In some cases, stripping the debug information from the code is not an acceptable solution, because certain application features required at runtime are dependent on the availability of the debugging information. Furthermore, removing the debugging information increases the deployment complexity, because the additional precompile step with the "-s" option is required to reach an intermediate stage (that is, bytecode) before the application is loaded into memory, whereas in general the dynamic scripting language source script has been directly executed.

Additionally, dynamic scripting language codes often are compressed using common data compression algorithms. Even though the uncompressed version of precompiled bytecode may occupy less memory than the uncompressed source code, after compression the precompiled code can occupy more memory space than the original text-format source code. Thus, in some applications—for example, in embedded systems with limited flash memory—it is desirable to store source code, rather than precompiled bytecode, to further reduce the amount of required memory.

SUMMARY

According to one embodiment of the present invention, a system for reducing a memory space required to store an application written in a dynamic scripting language includes an input/output device that receives a request corresponding to a segment of program code in a program module in the dynamic scripting language. The system further includes an on-demand loader that determines whether or not the segment of program code is in memory and identifies, in response to having determined the segment of program code is not in memory, a location in storage where at least a portion of the program module containing the segment of program code is stored, locates the segment of program code in a second copy of the portion of the program module, and copies the segment of program code into a first copy of the program module in memory. The system also includes a code loader that loads the second copy of the portion of the program module containing the segment of program code from the storage into memory.

According to another embodiment of the present invention, a method of reducing the memory space required to store an application written in a dynamic scripting language includes receiving a request corresponding to a segment of program code in the program module, determining whether or not program code is in memory, and if not, identifying a location in storage where at least a portion of the program module containing the segment of program code is stored. The method also includes loading a second copy of the program module containing the segment of program code from storage into memory, locating the segment of program code in the second copy of the portion of the program module. The method further includes copying the segment of program code into the first copy of the program module in memory.

The details of one or more embodiments of the invention are set forth in the accompanying drawings and the descrip-

DETAILED DESCRIPTION

Figure 1:
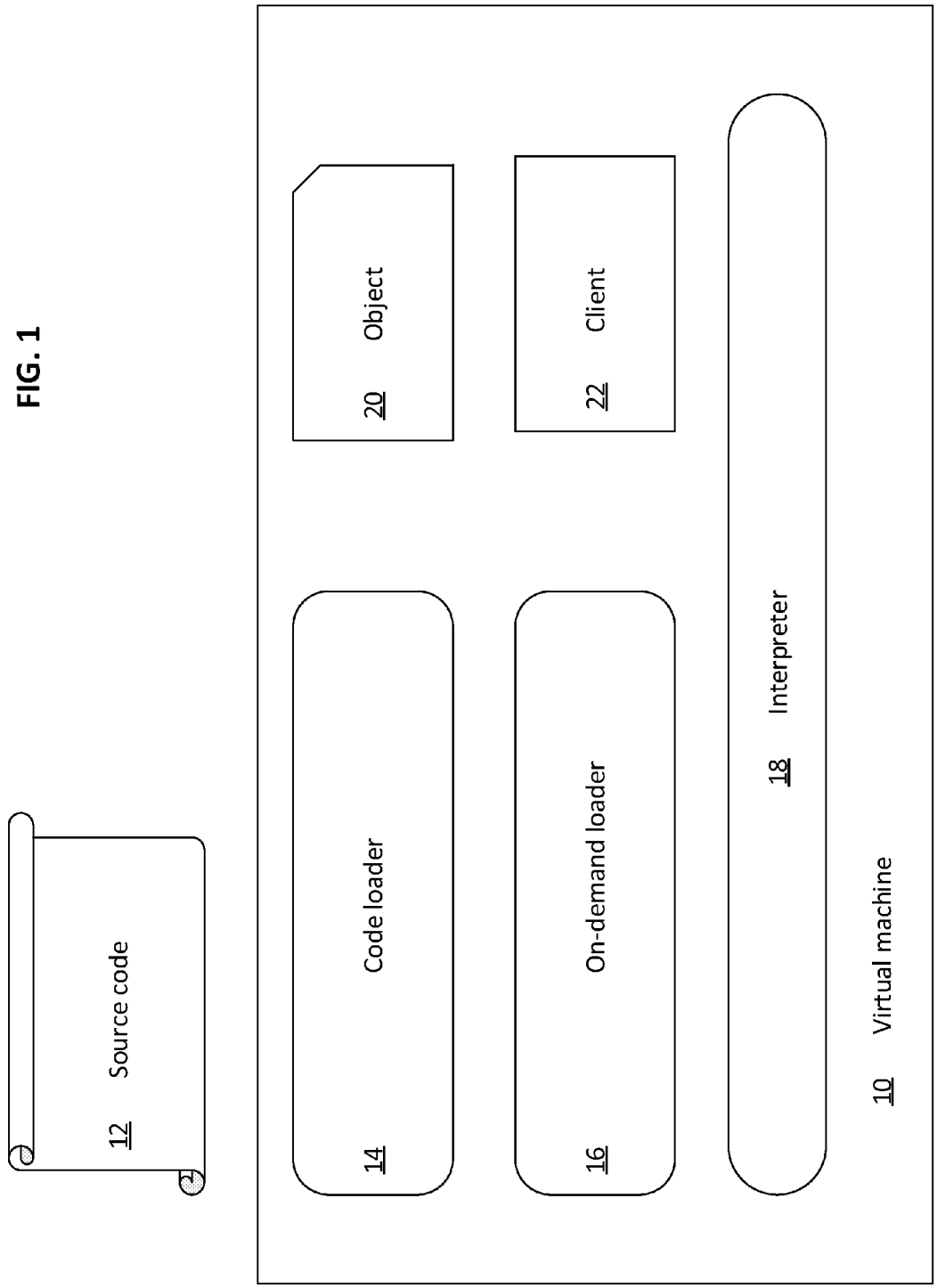
FIG. 1 is a schematic view illustrating a dynamic-scripting-language virtual machine that employs an on-demand source-code loader in accordance with an embodiment of the present invention.

An embodiment of the present invention is shown in FIG. 1, which illustrates an exemplary dynamic-scripting-language virtual machine 10 that employs an on-demand dynamic-scripting-language source-code loading process in order to reduce the memory space required to store an application in dynamic-scripting-language source code 12. The virtual machine 10 includes a code loader 14, an on-demand loader 16, an interpreter 18, an object 20 and a client 22.

The code loader 14 reads the original-text source code 12, redacts each application object 20 by removing a category of program code, and loads, or inserts, a redacted source code placeholder for each object 20 into memory. For example, in one embodiment the code loader 14 removes debug information from each of the function objects in the source code 12 during online compiling, and loads the redacted source code for each object 20 into memory. In another embodiment, the code loader 14 generates a function stub for each function in the original source code 12. For example, the function stub records meta information, such as the source code filename, the function proto, and the start and end location (line and column numbers) of the function in the source file.

Thus, the virtual machine 10 removes a category of program code, such as debug information or function code, and stores the location where to find the original source code, when the virtual machine 10 loads and compiles the source code into bytecode in memory. In an alternative embodiment, the redacted function code section data is stored in secondary storage, such as a hard disk drive. Because the source code placeholders occupy relatively less memory space compared to the full source code, the memory consumption of the dynamic-scripting-language application is reduced.

When the object 20 subsequently is called or queried, or debug information is requested, the on-demand loader 16 prompts the code loader 14 to reload the source code 12 and create a compiled tree structure of the function objects including the full function section code or debug information. The on-demand loader 16 searches the tree structure for the function object that corresponds to the called or queried object or the requested information. The code section or debug information is copied from the tree structure to the object 20, which is returned to the requesting or calling client 22.

In various embodiments of the invention, the virtual machine 10 runtime environment generates the requested debug information or code section on demand and dynamically modifies the function stub to form a complete function object according to the runtime behaviors. Thus, only functions actually executed at run time are filled with code section or debug information in memory. All other functions in the source code are represented in memory by a redacted placeholder, for example, a function stub or a function object without debug information.

The on-demand dynamic-scripting-language source-code loading systems described herein can offer advantages such as reduced memory consumption. The amount of memory required to store the bytecode is essentially reduced by the quantity of debug information or code removed, yet the detailed code sections or debug information is made available when requested. There are no language specific limitations, so this approach can be used with any dynamic scripting language. All of the components of the source code application can maintain the original features. In this transparent, purely dynamic approach, no additional precompilation step is required. The original source code can be maintained in storage using any known compression algorithm.

Figure 2:
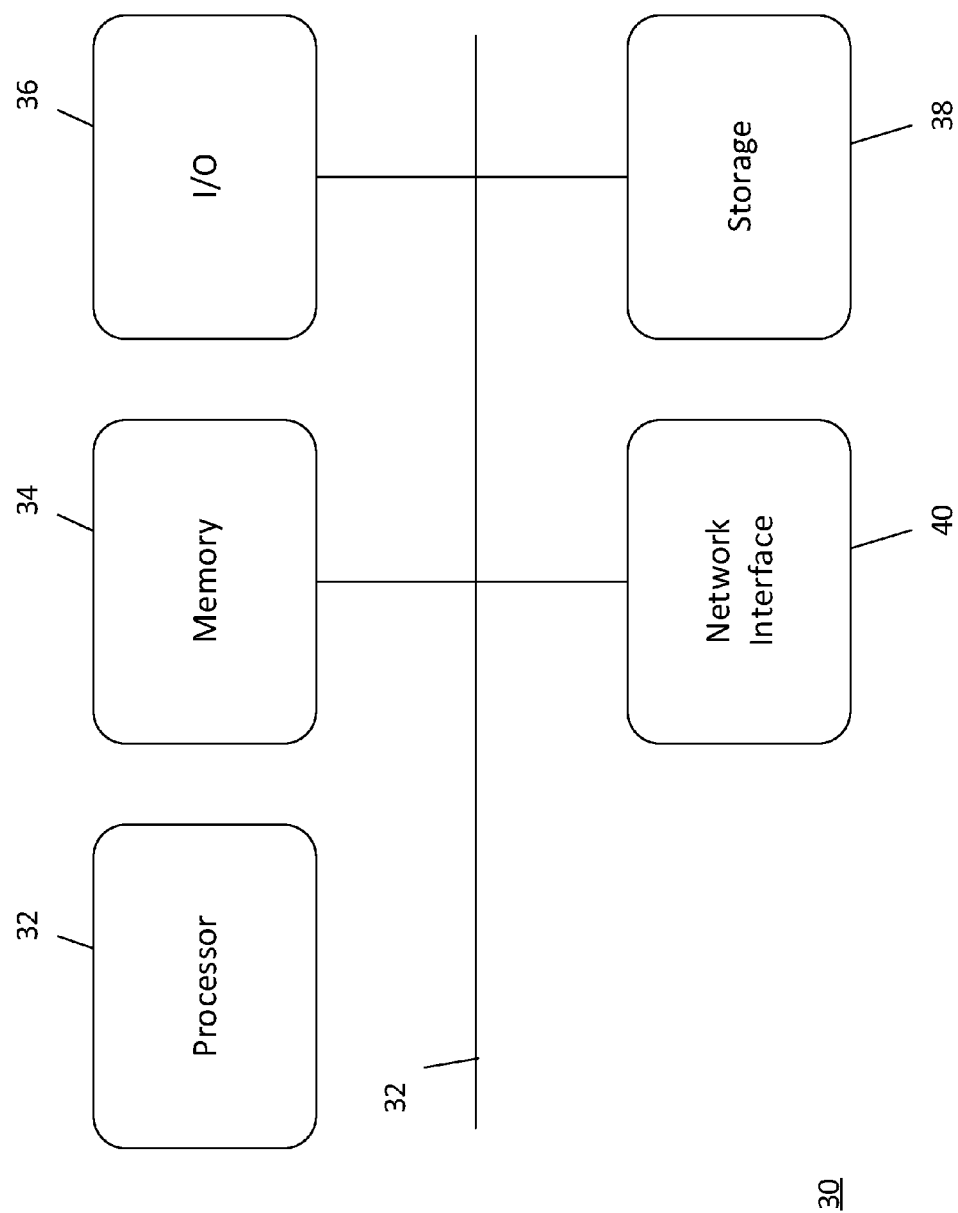
FIG. 2 is a schematic view depicting a computing system that can implement the dynamic-scripting-language virtual machine of FIG. 1.

As illustrated in FIG. 2, an exemplary computing device 30 that can implement the dynamic-scripting-language virtual machine 10 of FIG. 1 includes a processor 32, a memory 34, an input/output device (I/O) 36 storage 38 and a network interface 40. The various components of the computing device 30 are coupled by a local data link 42, which in various embodiments incorporates, for example, an address bus, a data bus, a serial bus, a parallel bus, or any combination of these.

The computing device 30 communicates information to and requests input from the user or other devices by way of the I/O 36, which in various embodiments incorporates, for example, an interactive, menu-driven, visual display-based user interface, or graphical user interface (GUI), a pointing device, such as a, with which the user may interactively input information using direct manipulation of the GUI. In some embodiments, direct manipulation includes the use of an alphanumeric input device, such as a keyboard, a pointing device, such as a mouse, a touchpad, a trackball, a joystick or a stylus, to select from a variety of windows, icons and selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of an alphanumeric input device, a pointing device, buttons or keys, for example, using direct voice input.

The computing device 30 can be coupled to a communication network by way of the network interface 40, which in various embodiments incorporates, for example, any combination of devices, as well as any associated software or firmware, configured to couple processor-based systems, including modems, access points, network interface cards, LAN or WAN interfaces, wireless or optical interfaces and the like, along with any associated transmission protocols, as may be desired or required by the design.

For example, the source code 12 can, in some embodiments, be contained in a remote storage communicatively interconnected to the computing system 30 by way of a communication network. In various embodiments, the communication network can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

The computing device 30 can be used, for example, to implement the functions of the components of the dynamic-scripting-language virtual machine of FIG. 1. In various embodiments, the computing device 30 can include, for example, a server, a controller, a router, a workstation, a mainframe computer, personal computer (PC), a note pad, a computing tablet, a personal digital assistant (PDA), a smart phone, or the like. Programming code, such as source code, object code or executable code, stored on a computer-readable medium, such as the storage 38 or a peripheral storage component coupled to the computing device 30, can be loaded into the memory 34 and executed by the processor 32 in order to perform the functions of the dynamic-scripting-language virtual machine 10.

Figure 3:
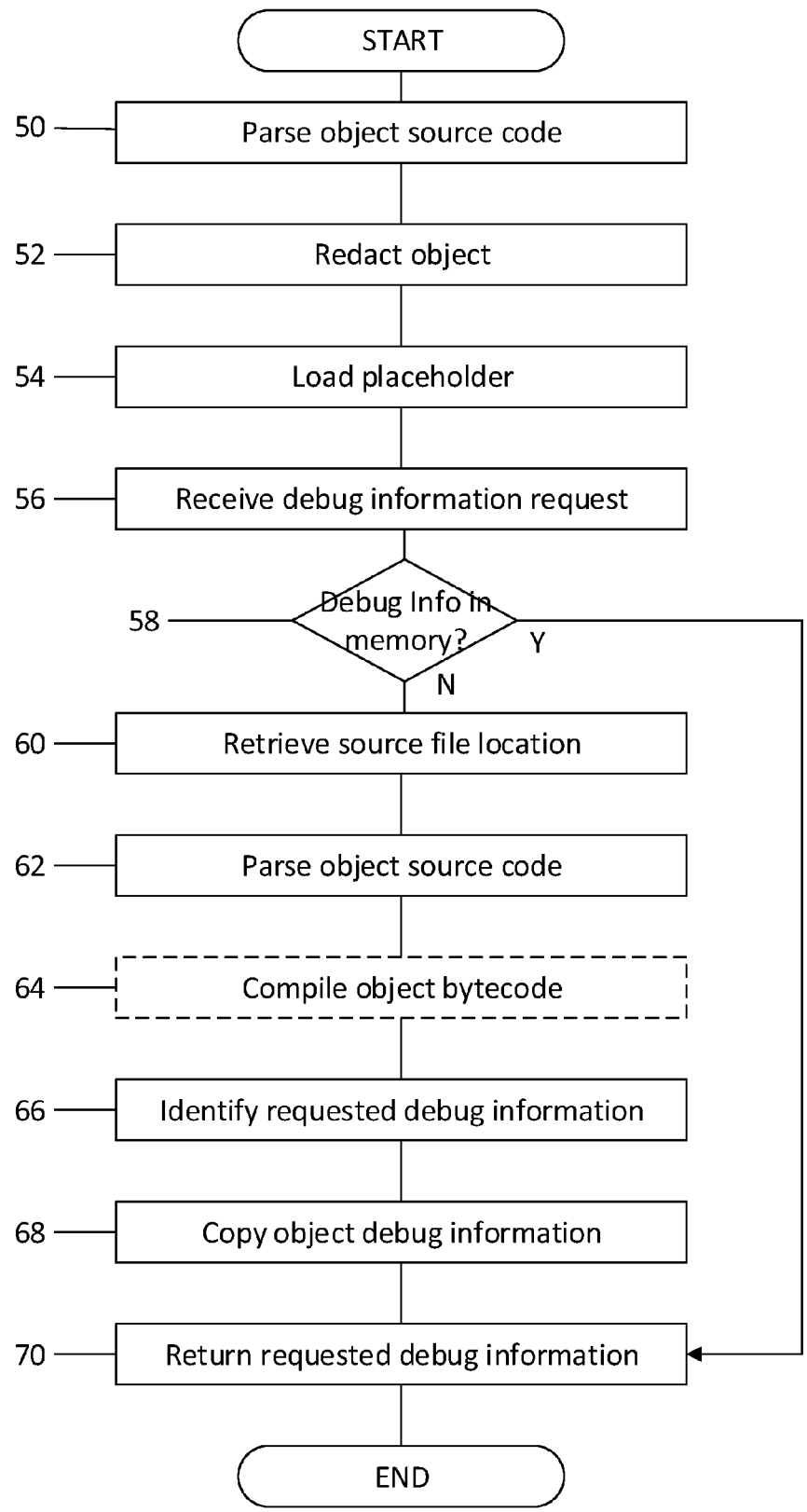
FIG. 3 is a flowchart representing a method of on-demand dynamic-scripting-language source-code debug information loading in accordance with an embodiment of the present invention.

Referring now to FIG. 3, an exemplary process flow is illustrated that may be performed, for example, by the dynamic-scripting-language virtual machine 10 of FIG. 1 to implement an embodiment of the method described in this disclosure for on-demand dynamic-scripting-language source-code loading. Blocks shown with dashed lines in FIG. 3 are optional items that may not be performed in all implementations. The process begins at block 50, where an object, such as a function, in the source code of an application written in a dynamic-scripting-language is parsed. For example, in an embodiment, the object is parsed at run time by a code loader module of a dynamic-scripting-language virtual machine.

The object is redacted, in block 52, to remove all debugging information from the code. For example, in an embodiment, the debug information is removed when the source code is compiled into bytecode. A placeholder is loaded, or inserted, into the bytecode in memory, in block 54. For example, in an embodiment, the placeholder includes the source code file location, along with the source code file line and column numbers that delineate the beginning and end of the segment of source code corresponding to the code redacted from the bytecode memory.

In block 56, a request for debug information in the object is received from a runtime client, such as the error handling component or the reflection component of the virtual machine. The process checks, in block 58, to verify whether or not the requested debug information is currently in memory. For example, if the debug information from the object has previously been requested during program execution, and a cleanup procedure, such as garbage collection, has not been performed in the time that has intervened, then the requested debug information may still be loaded in memory. If so, the requested debug information is read from memory and returned to the requesting client.

Otherwise, if the requested debug information is not currently in memory, the corresponding source file location is retrieved, in block 60. For example, in an embodiment, the on-demand debug information loader reads the source file location in the placeholder in memory. In block 62, the object source code is re-parsed. For example, in an embodiment, the on-demand loader module asks the code loader module to reload the source code for the object, including the debug information. In block 64, the object source code is optionally recompiled, with the accompanying debug information, into bytecode.

In some embodiments, the source code for the entire application, or part of the application source code in addition to that of the immediate function, such as the source code of a calling function or a called function, is re-parsed and optionally recompiled in block 62 and block 64. In particular, parsing and compiling the source code for the whole application is required with programming languages that apply lexical scoping, for example, dynamic scripting languages that use the "upvalue" concept. Otherwise, the resulting compiled function may not include the correct instructions and variables.

For example, in the Lua programming language, the following function can be globally compiled or locally compiled with respect to function B( ) with differing results:

```
function A( )
    local a;
    function B( )
        local b = a;
        print(b);
    end
end
```

Function B( ) is correctly translated by globally compiling function A( ) before isolating function B( ), as follows:

```
.local "b" ; 0
.upvalue "a" ; 0
.const "print" ; 0
[1] getupval 0 0          ; a
[2] getglobal 1 0         ; print
[3] move 2 0
[4] call 1 2 1
[5] return 0 1
```

However, locally compiling function B( ) yields an incorrect translation of function B( ) with different upvalue tables, as well as with different instructions, as follows:

```
.local "b" ; 0
.const "a" ; 0
.const "print" ; 0
[1] getglobal 0 0         ; a
[2] getglobal 1 1         ; print
[3] move 2 0
[4] call 1 2 1
[5] return 0 1
```

In block 66, the debug information relevant to the request but not included in the bytecode in memory is identified, and in block 68, the debug information is copied into the bytecode in memory.

Figure 4:
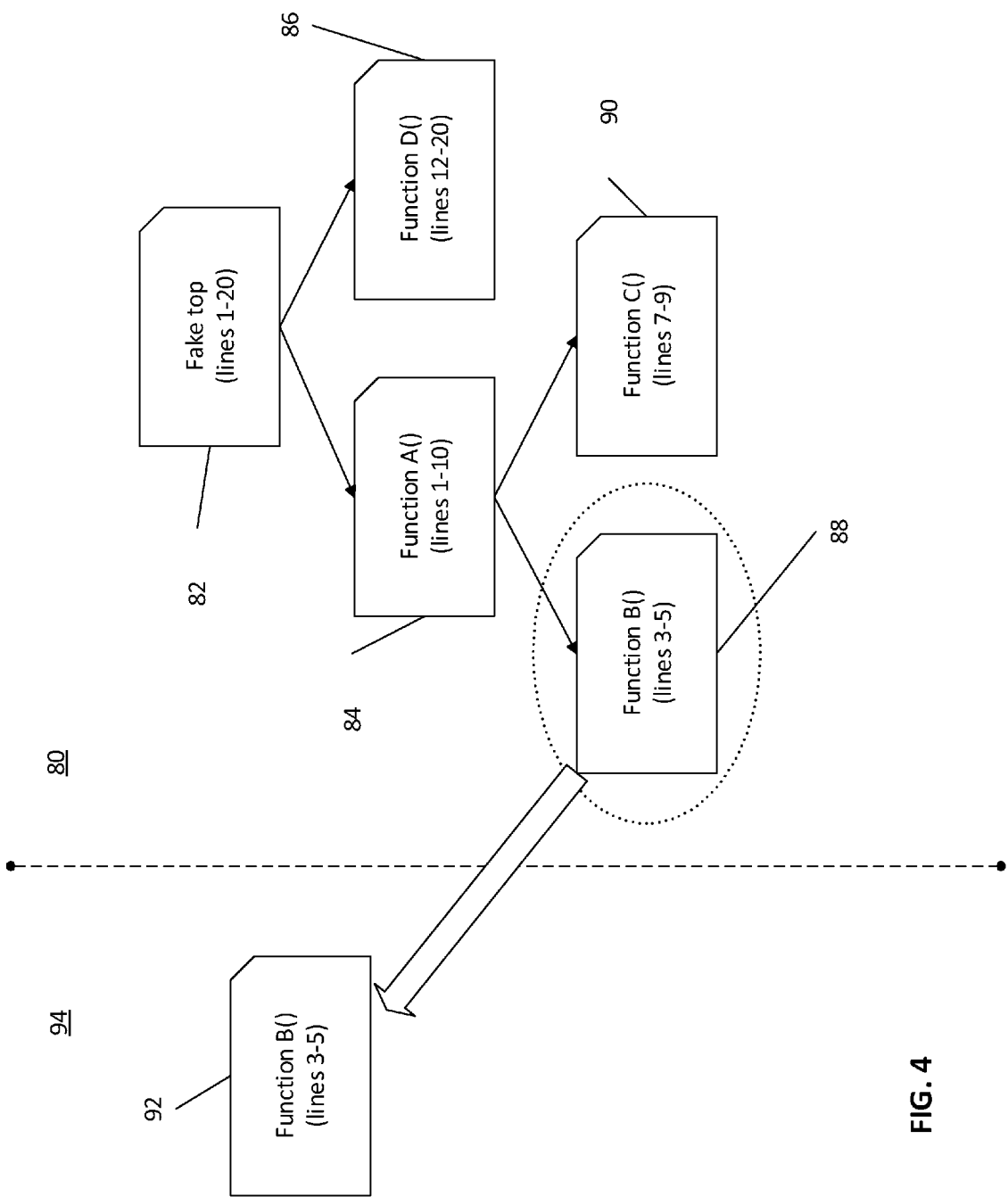
FIG. 4 is an illustration of a redacted function placeholder and a compiled dynamic-scripting-language application tree structure in accordance with an embodiment of the present invention.

Referring to FIG. 4, for example, the source code of a complete application written in a dynamic scripting language is compiled into a tree structure 80, in accordance with block 62 and block 64 of FIG. 3. A fake top 82 represents the entry into the application, and the bytecode corresponding to each of the functions in the application source code is represented in the tree: for example, Function A( ) 84, corresponding to source code lines 1-10; Function D( ) 86, corresponding to source code lines 12-20; Function B( ) 88, corresponding to source code lines 3-5; and Function C( ) 90, corresponding to source code lines 7-9.

The tree structure 80 is searched by source location, and the debug information corresponding to the relevant function for which debug information was requested in accordance with block 56 of FIG. 3 (depicted as Function B( ) in FIG. 4) is identified in accordance with block 66 of FIG. 3. The debug information from the counterpart function object in the compiled tree is copied into the corresponding Function B( ) 92 in the bytecode in memory 94, supplementing or replacing the placeholder that was included when the bytecode was initially compiled.

Referring again to FIG. 3, the requested debug information is returned to the client, in block 70, in support of execution of the application. This completes the on-demand dynamic-scripting-language source-code debug information loading process.

Figure 5:
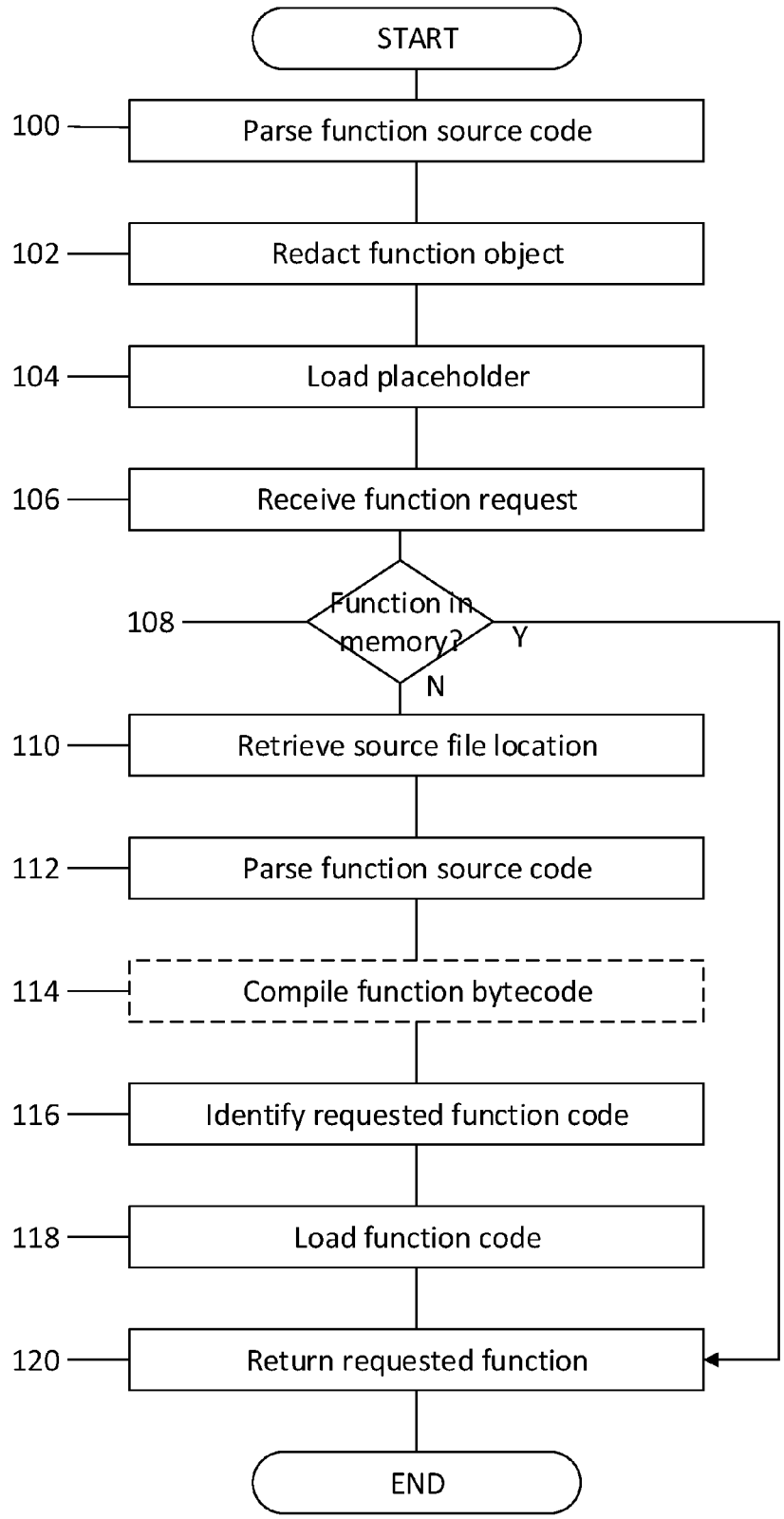
FIG. 5 is a flowchart representing a method of on-demand dynamic-scripting-language source-code function loading in accordance with an embodiment of the present invention.

Referring to FIG. 5, an exemplary process flow is illustrated that may be performed, for example, by the dynamic-scripting-language virtual machine 10 of FIG. 1 to implement another embodiment of the method described in this disclosure for on-demand dynamic-scripting-language source-code loading. Blocks shown with dashed lines in FIG. 3 are optional items that may not be performed in all implementations. The process begins at block 100, where a function object, in the source code of an application written in a dynamic-scripting-language is parsed. For example, in an embodiment, the function is parsed at run time by a code loader module of a dynamic-scripting-language virtual machine.

The object is redacted, in block 102, to remove the function code section. For example, in an embodiment, the function code is removed when the source code is compiled into bytecode. A placeholder is loaded, or inserted, into the bytecode in memory, in block 104. For example, in an embodiment, the placeholder includes the source code file location, along with the source code file line and column numbers that delineate the beginning and end of the segment of source code corresponding to the code redacted from the bytecode memory.

In block 106, a call or query request for the function is received from a runtime client, such as the execution component of the virtual machine. The process checks, in block 108, to verify whether or not the requested function code section is currently in memory. For example, if the function has previously been requested during program execution, and a cleanup procedure, such as garbage collection, has not been performed in the time that has intervened, then the requested function code may still be loaded in memory. If so, the requested function code is read from memory and returned to the requesting client, in block 120.

Otherwise, if the requested function code is not currently in memory, the corresponding source file location is retrieved, in block 110. For example, in an embodiment, the on-demand code section loader reads the source file location in the placeholder in memory. In block 112, the function source code is re-parsed. For example, in an embodiment, the on-demand loader module asks the code loader module to reload the source code for the function object. In block 114, the object source code is optionally recompiled into bytecode.

As explained above with reference to FIGS. 3 and 4, in some embodiments the source code for the entire application, or part of the application source code in addition to that of the immediate function, such as the source code of a calling function or a called function, is re-parsed and optionally recompiled in block 112 and block 114. In particular, parsing and compiling the source code for the whole application is required with programming languages that apply lexical scoping, for example, dynamic scripting languages that use the "upvalue" concept. Otherwise, the resulting compiled function may not include the correct instructions and variables, as described above.

In block 116, the code that is relevant to the request but not included in the bytecode in memory is identified, and in block 118, the complete function is copied into the bytecode in memory. In an alternative embodiment, the redacted code sections are stored in secondary storage, and the function can be copied directly from the secondary storage into the bytecode in memory. The requested function is returned to the client, in block 120, in support of execution of the application. This completes the on-demand dynamic-scripting-language source-code function loading process.

In alternative embodiments, a cleanup process can be performed after the requested function or debug information has been returned. For example, a garbage collection process can remove the section code or debug information from the bytecode in memory to again reduce the memory space required to store the bytecode.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon.

In this respect, any combination of one or more computer readable media may be utilized, including, but not limited to, an electronic, magnetic, optical, electromagnetic, infrared, or semiconductor system, apparatus, or device, or any suitable combination of these. More specific examples of computer readable storage media would include the following non-exhaustive list: a portable computer diskette, a hard disk, a random access memory (RAM), a read-only memory (ROM), an erasable programmable read-only memory (EPROM), a Flash memory, a portable compact disc read-only memory (CD-ROM), an optical storage device, network-attached storage (NAS), a storage area network (SAN), magnetic tape, or any suitable combination of these. In the context of this disclosure, a computer readable storage medium may include any tangible medium that is capable of containing or storing program instructions for use by or in connection with a data processing system, apparatus, or device.

Computer program code for carrying out operations regarding aspects of this disclosure may be written in any combination of one or more programming languages, including object oriented programming languages such as Java, Smalltalk, C++, or the like, as well as conventional procedural programming languages, such as the "C," FORTRAN, COBOL, Pascal, or the like. The program code may execute entirely on an individual personal computer, as a stand-alone software package, partly on a client computer and partly on a remote server computer, entirely on a remote server or computer, or on a cluster of distributed computer nodes. In general, a remote computer, server or cluster of distributed computer nodes may be connected to an individual (user) computer through any type of network, including a local area network (LAN), a wide area network (WAN), an Internet access point, or any combination of these.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. A method implemented by one or more processors, wherein the one or more processors execute instructions stored on a memory to perform the method steps comprising:
   redacting one or more code sections from dynamic scripting language program source code;
   inserting a respective placeholder in the program source code for each redacted code section to generate redacted program code;
   compiling the redacted program code to generate compiled code;
   receiving a request for a redacted code section of the compiled code;
   determining that the requested code section is not in a memory and based thereon:
      identifying a location in a storage where the requested redacted code section is stored from the respective placeholder of the requested code section;
      obtaining the requested redacted code section from the identified storage location; and
      modifying the compiled code to include the obtained redacted code section.

2. The method of claim 1 wherein the obtained redacted code section is a function definition or debugging information.

3. The method of claim 2 wherein the obtained redacted code section is a function definition and wherein modifying the compiled code to include the obtained redacted code section comprises forming a complete function in the compiled code using the obtained redacted code section.

4. The method of claim 1, wherein modifying the compiled code to include the obtained redacted code section comprises:
   compiling the obtained redacted code section; and
   inserting the compiled redacted code section into the compiled code in place of the placeholder.

5. The method of claim 1 wherein identifying the location in the storage wherein the requested redacted code section is stored from the respective placeholder of the requested redacted code section comprises:
   obtaining a location of a file and an offset within the file where the requested redacted code section in stored.

6. The method of claim 1 wherein the request is a function call or a query of a function definition.

7. The method of claim 1, further comprising executing the modified compiled code.

8. The method of claim 7 wherein the execution is within a virtual machine.

9. A system comprising:
   a memory storage comprising instructions; and
   one or more processors in communication with the memory, wherein the one or more processors execute the instructions to:
      redact one or more code sections from dynamic scripting language program source code;
      insert a respective placeholder in the program source code for each redacted code section to generate redacted program code;
      compile the redacted program code to generate compiled code;
      receiving a request for a redacted code section of the compiled code;
      determine that the requested code section is not in a memory and based thereon:
         identify a location in a storage where the requested redacted code section is stored from the respective placeholder of the requested code section;
         obtain the requested redacted code section from the identified storage location; and
         modify the compiled code to include the obtained redacted code section.

10. The system of claim 9 wherein the obtained redacted code section is a function definition or debugging information.

11. The system of claim 10 wherein the obtained redacted code section is a function definition and wherein the one or more processors execute the instructions to perform:
   form a complete function in the compiled code using the obtained redacted code section.

12. The system of claim 9, wherein the one or more processors execute the instructions to perform:
   compile the obtained redacted code section; and
   insert the compiled redacted code section into the compiled code in place of the placeholder.

13. The system of claim 9 wherein the one or more processors execute the instructions to perform:
   obtain a location of a file and an offset within the file where the requested redacted code section in stored.

14. The system of claim 9 wherein the request is a function call or a query of a function definition.

15. The system of claim 9, wherein the one or more processors execute the instructions to perform execute the modified compiled code.

16. The system of claim 15 wherein the execution is within a virtual machine.

17. A non-transitory computer-readable medium containing storing instructions that, when executed by one or more processors, cause the one or more processors execute the instructions to:
   redact one or more code sections from dynamic scripting language program source code;

insert a respective placeholder in the program source code for each redacted code section to generate redacted program code;

compile the redacted program code to generate compiled code;

receiving a request for a redacted code section of the compiled code;

determine that the requested code section is not in a memory and based thereon:

identify a location in a storage where the requested redacted code section is stored from the respective placeholder of the requested code section;

obtain the requested redacted code section from the identified storage location; and modify the compiled code to include the obtained redacted code section.

18. The computer-readable medium of claim 17 wherein the obtained redacted code section is a function definition or debugging information.

19. The computer-readable medium of claim 18 wherein the obtained redacted code section is a function definition and wherein the one or more processors execute the instructions to perform:

form a complete function in the compiled code using the obtained redacted code section.

20. The computer-readable medium of claim 17, wherein the one or more processors execute the instructions to perform:

compile the obtained redacted code section; and insert the compiled redacted code section into the compiled code in place of the placeholder.

21. The computer-readable medium of claim 17 wherein the one or more processors execute the instructions to perform:

obtain a location of a file and an offset within the file where the requested redacted code section in stored.

22. The computer-readable medium of claim 17 wherein the request is a function call or a query of a function definition.

23. The computer-readable medium of claim 17, wherein the one or more processors execute the instructions to perform execute the modified compiled code.

24. The computer-readable medium of claim 23 wherein the execution is within a virtual machine.

* * * * *